(12) United States Patent
Kobayashi

(10) Patent No.: US 10,754,934 B2
(45) Date of Patent: Aug. 25, 2020

(54) DEVICE, CONTROL METHOD OF THE SAME, AND STORAGE MEDIUM

(71) Applicant: CANON KABUSHIKI KAISHA, Tokyo (JP)

(72) Inventor: Makoto Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 148 days.

(21) Appl. No.: 16/136,010

(22) Filed: Sep. 19, 2018

(65) Prior Publication Data

US 2019/0095598 A1 Mar. 28, 2019

(30) Foreign Application Priority Data

Sep. 27, 2017 (JP) .................................. 2017-187132

(51) Int. Cl.
*G06F 21/31* (2013.01)
*H04L 29/06* (2006.01)
*G06F 21/44* (2013.01)

(52) U.S. Cl.
CPC .............. *G06F 21/31* (2013.01); *G06F 21/44* (2013.01); *H04L 63/0807* (2013.01); *H04L 63/10* (2013.01); *H04L 63/0892* (2013.01); *H04L 63/107* (2013.01)

(58) Field of Classification Search
CPC ...................................................... G06F 21/31
See application file for complete search history.

(56) References Cited

U.S. PATENT DOCUMENTS

2014/0380428 A1* 12/2014 Kobayashi .............. H04L 63/10 726/4
2015/0365399 A1* 12/2015 Biswas ............... H04L 63/0815 726/8

FOREIGN PATENT DOCUMENTS

JP 2017-107396 A 6/2017

OTHER PUBLICATIONS

D. Hardt et al., "The OAuth 2.0 Authorization Framework", Internet Engineering Task Force, RFC 6749, ISSN: 2070-1721, Oct. 13, 2012, pp. 1-76.

* cited by examiner

*Primary Examiner* — Simon P Kanaan
(74) *Attorney, Agent, or Firm* — Canon U.S.A., Inc. I.P. Division

(57) ABSTRACT

A device identifies an authorization endpoint based on region information received from an application and associated with the user, transmits an authorization code request to an authorization endpoint, and receives an authorization code response from the authorization endpoint, corresponding to the authorization code request. Alternatively, the region information is obtained from pre-existing information on the device.

13 Claims, 9 Drawing Sheets

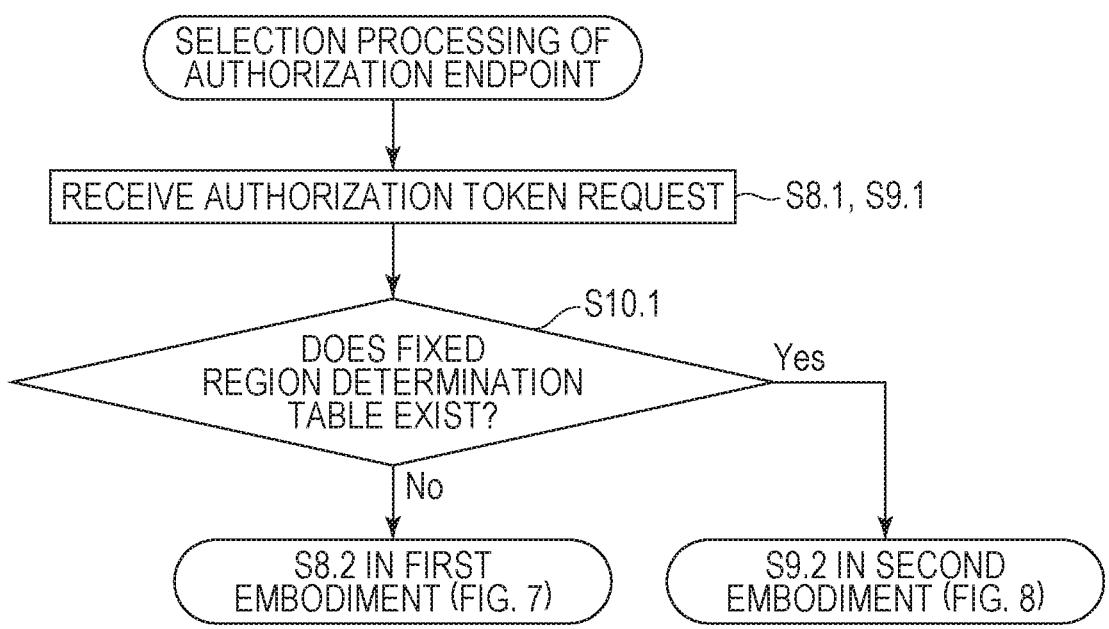

DEVICE, CONTROL METHOD OF THE SAME, AND STORAGE MEDIUM

BACKGROUND OF THE INVENTION

Field of the Invention

The present disclosure generally relates to access authorization by utilizing an authorization server.

Description of the Related Art

There is an arrangement where an application that a device such as a multi-function peripheral (MFP) has, obtains an authorization token from an authorization server via a token provider that the device has. An authorization token is a token that permits a device, to which authority has been transferred by an authorization operation by an authorized user, to access an application programming interface (API) that a resource server has made public. Using the obtained authorization token enables the device to use the API that the resource server has made public without handing over user information such as ID, password information, authorization information, or the like. If the device is an MFP for example, the device can display and print data using Web services such as printing services, business form services, and so forth, that the resource server provides.

An authorization token is issued by an authorization server executing an authorization flow, Authorization Code Grant, of a standard protocol called OAuth 2.0. Specifically, the authorization server issues an authorization token to a token provider that has transmitted a token request thereto, by a user authorizing, via a Web browser, the device to use the Web service of the resource server. A token request is a request for the token provider to obtain an authorization token from the authorization server.

In order for the token provider to obtain the authorization token, the token provider transmits an authorization code request to the authorization server.

Japanese Patent Laid-Open No. 2017-107396 discloses a system where an application that a device has, obtains an authorization token from an authorization server via a token provider that the device has.

SUMMARY OF THE INVENTION

A device includes a transmission unit configured to transmit, to an authorization server, an authorization code request for the authorization server to issue an authorization code indicating that a user has permitted the device to access a resource server; a reception unit configured to receive an authorization code response from the authorization server corresponding to the authorization code request, and a token provider which obtains region information, identifying a region where the authorization server is located, from an application on the device, and identifies, based on the obtained region information, an authorization endpoint, to which to transmit the authorization code request, wherein the transmission unit transmits the authorization code request to the identified authorization endpoint, and wherein the reception unit receives the authorization code response corresponding to the authorization code request transmitted by the transmission unit.

Further features of the present disclosure will become apparent from the following description of exemplary embodiments with reference to the attached drawings.

BRIEF DESCRIPTION OF THE DRAWINGS

FIG. 9 illustrates an example of a region input screen in a Web browser.

FIG. 10 illustrates an example of a determining flowchart for executing processing according to the first embodiment or processing according to the second embodiment.

DESCRIPTION OF THE EMBODIMENTS

Figure 1:
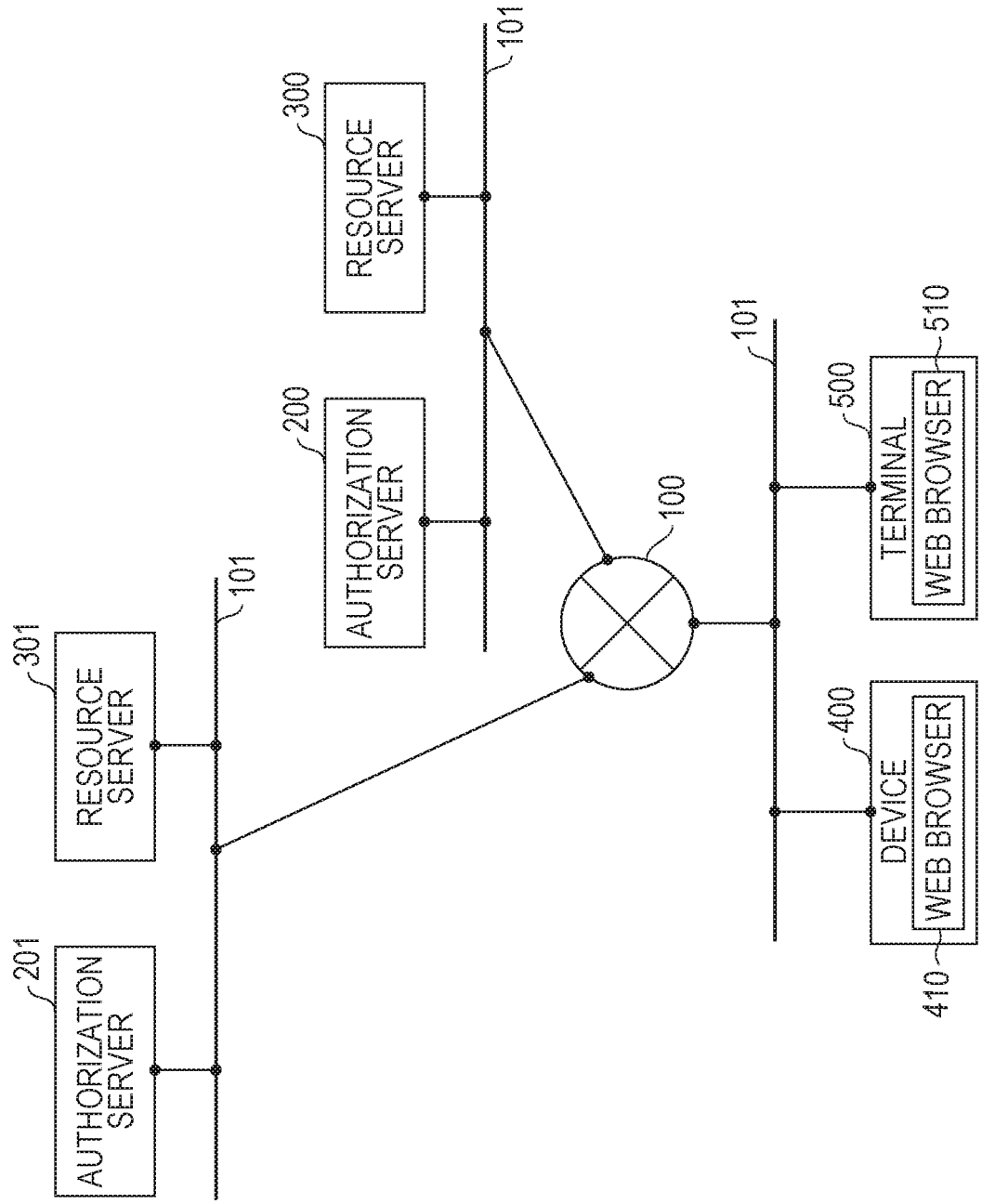
FIG. 1 illustrates an authority transfer system according to an embodiment of the present disclosure.

User information is managed in an authorization server in a particular geographical region (hereinafter, "region"). In a case where there is user information for multiple users, the multiple user information may not all be managed by an authorization server in the same region. Specifically, in a case where an application is distributed to multiple regions and is used worldwide, the user information of the user using the application is managed by an authorization server where the user information is located. An authorization token is issued at an authorization server where the user information is located, the issued authorization token is verified, and a resource server provides a Web service to the application. The reason why authorization tokens are issued by authorization servers corresponding to the location of user information is that there are cases where restrictions are placed on transfer and sharing of user information among regions, from the perspectives of protection of personal information, national security, and so forth.

A situation where an application is used in multiple regions will be considered here. In this case, the application transmits information relating to the region where user information is located (hereinafter, "region information") to the token provider. The token provider transmits an authorization code request to the authorization server, based on the received region information. Accordingly, there is a broader range of options for authorization endpoints, which is the destination for transmitting the authorization code request.

The token provider needs to identify an authorization endpoint from the region information specified by the application. An authorization endpoint is an address specifying the destination for transmitting the authorization code request to authorization servers that are present in various regions.

It has been found desirable for a device to be able to identify an authorization endpoint uniform resource locator (URL) that is appropriate for transmission of an authorization code request, in accordance with region information received from an application.

Preferred embodiments of the present disclosure will be described with reference to the drawings. Note that in the following description, in a case where either of later-described authorization server 200 and authorization server 201 will suffice, this will be described as "authorization server 200 or 201", and in a case where either of resource server 300 and resource server 301 will suffice, this will be described as "resource server 300 or 301". Note however, that in a case where the authorization server 201 issues an authorization code or authorization token, an API made public by the resource server 301 is accessed using the authorization token issued by the authorization server 201. On the other hand, in a case where the authorization server 200 issues an authorization code or authorization token, an API made public by the resource server 300 is accessed using the authorization token issued by authorization server 200.

First, an authority transfer system according to an embodiment of the present disclosure will be described with reference to FIG. 1. The authority transfer system is realized on a network such as illustrated in FIG. 1. A wide area network (WAN) 100 is constructed using a World Wide Web (WWW) system. The WAN 100 and various types of devices 200 through 500 are connected via a local area network (LAN) 101.

The authorization servers 200 and 201 are servers for realizing OAuth 2.0 or similar protocol, and perform processing such as receiving authentication requests, issuing and managing authorization codes, and so forth. In FIG. 1, the authorization server 200 and resource server 300 are illustrated as being connected by the LAN 101, as are the authorization server 201 and resource server 301, but a configuration may be made where connection is made via the WAN 100. An arrangement may also be made where the authorization servers 200 and 201 are connected to a database server that is omitted from illustration via the LAN 101, and data used for the authorization servers 200 and 201 to realize the functions thereof are stored in the database server. Although the authorization server 200 and resource server 300, and the authorization server 201 and resource server 301, are each described as being separate servers in FIG. 1, a configuration may be made where the functions of both servers are realized on the same server.

Note that the form of location of the resource server 300 and authorization server 200 (or resource server 301 and authorization server 201) is not restricted to being in the same region or in the same system. Any form of location may be used as long as the resource server 300 is capable of querying regarding an authorization token issued by the authorization server 200. Alternatively, a form may be used where the resource server 300 verifies signature information received along with the authorization token, for example.

Examples of a device 400 include a printer, MFP, personal computer (PC), smartphone, and so forth. The user of a terminal 500 can use functions of various devices, such as making user authentication requests to the authorization servers 200 or 201, login operations of the device 400, and so forth, via a Web browser 510. Specific examples of the terminal 500 include a PC, smartphone, or the like.

The device 400 and terminal 500 have a Web browser 410 and Web browser 510, respectively. The user executes later-described authorization operations by operating the Web browser 410 or Web browser 510. The device 400 and terminal 500 are connected via the LAN 101. Note that in the following description, in a case where either of the Web browser 410 and Web browser 510 may be used to execute operations, the expression "Web browser 410 or 510" will be used.

Figure 2:
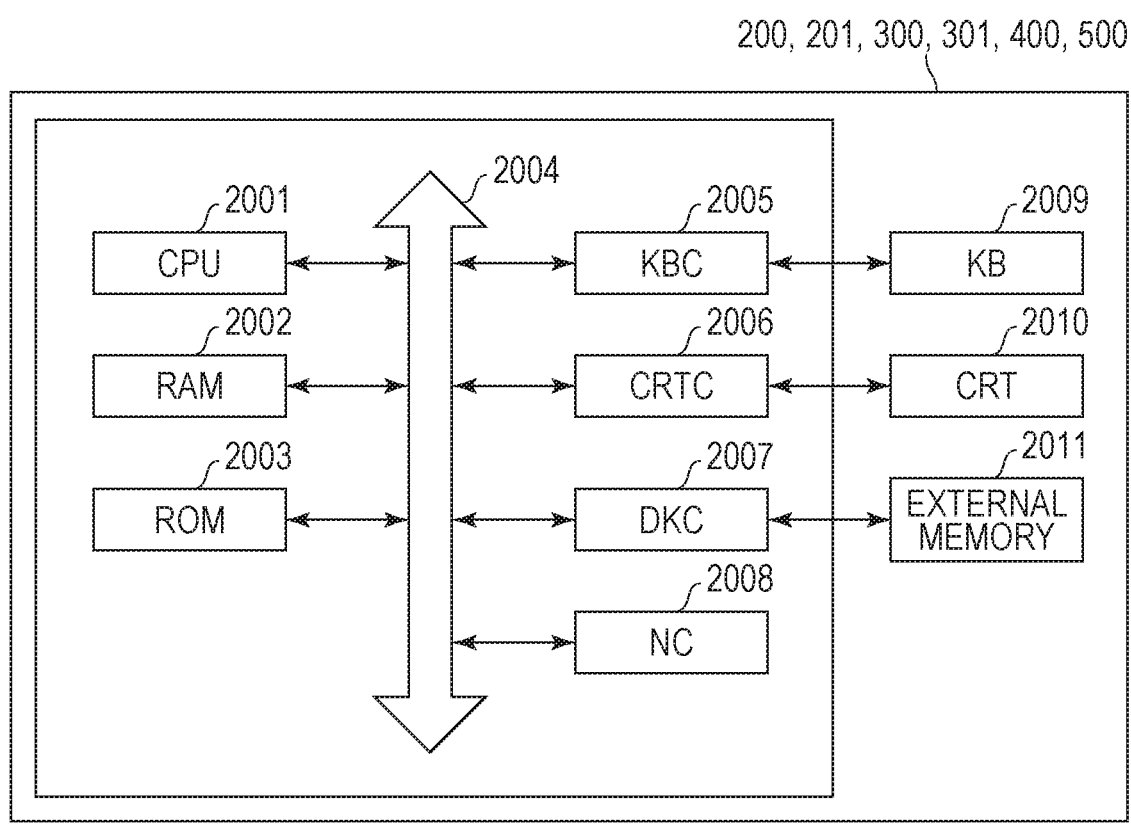
FIG. 2 is a diagram illustrating hardware configurations of devices.

Next, the hardware configuration of the authorization servers 200 and 201, resource servers 300 and 301, device 400, and terminal 500 will be described with reference to FIG. 2. Note that FIG. 2 is a block diagram of a general information processing device, and that the hardware configuration of a general information processing device, or a virtual hardware configuration of an information processing device provided as an IaaS (Infrastructure as a Service) may be applied to the various devices in the present embodiment. The device 400 will be exemplarily described in FIG. 2, but the resource servers 300 and 301, authorization servers 200 and 201, and terminal 500 also have similar hardware configurations.

A CPU 2001 is a unit that extracts programs from RAM 2002, ROM 2003, external memory 2011, and so forth, and executes commands in the programs to control the device 400. Later-described sequences are realized by these commands in the programs being executed. The CPU 2001 controls blocks connected to a system bus 2004.

The RAM 2002 is work memory used for the CPU 2001 to execute commands. An operating system (OS), applications, and other such programs, saved in the ROM 2003 or external memory 2011 are loaded to the RAM 2002, and the CPU 2001 executes the commands of these programs by sequentially reading these out. The ROM 2003 is a storage device where embedded programs including application programs and OS, as well as data and so forth, are recorded.

A keyboard controller (KBC) 2005 is a unit that controls input from a keyboard (KB) 2009 and a pointing device that is omitted from illustration. A cathode ray tube controller (CRTC) 2006, or a controller with a similar function, is a unit that controls display on a CRT display 2010 or similar display unit. A disk controller (DKC) 2007 is a unit that controls data access to the external memory 2011. A network controller (NC) 2008 executes communication control processing with other devices connected via the WAN 100 and LAN 101. In a case of a virtual information processing device provided as IaaS, the configuration does not have the KBC 2005, CRTC 2006, and so forth, and a keyboard and CRT display that the terminal connected via the NC 2008 has are operated. Unless specifically stated otherwise, in the following description, the primary entity of the hardware when the functions of the various devices are executed is the CPU 2001, and the primary entity of software is programs installed in the RAM 2002, ROM 2003, external memory 2011, and so forth.

Figure 3:
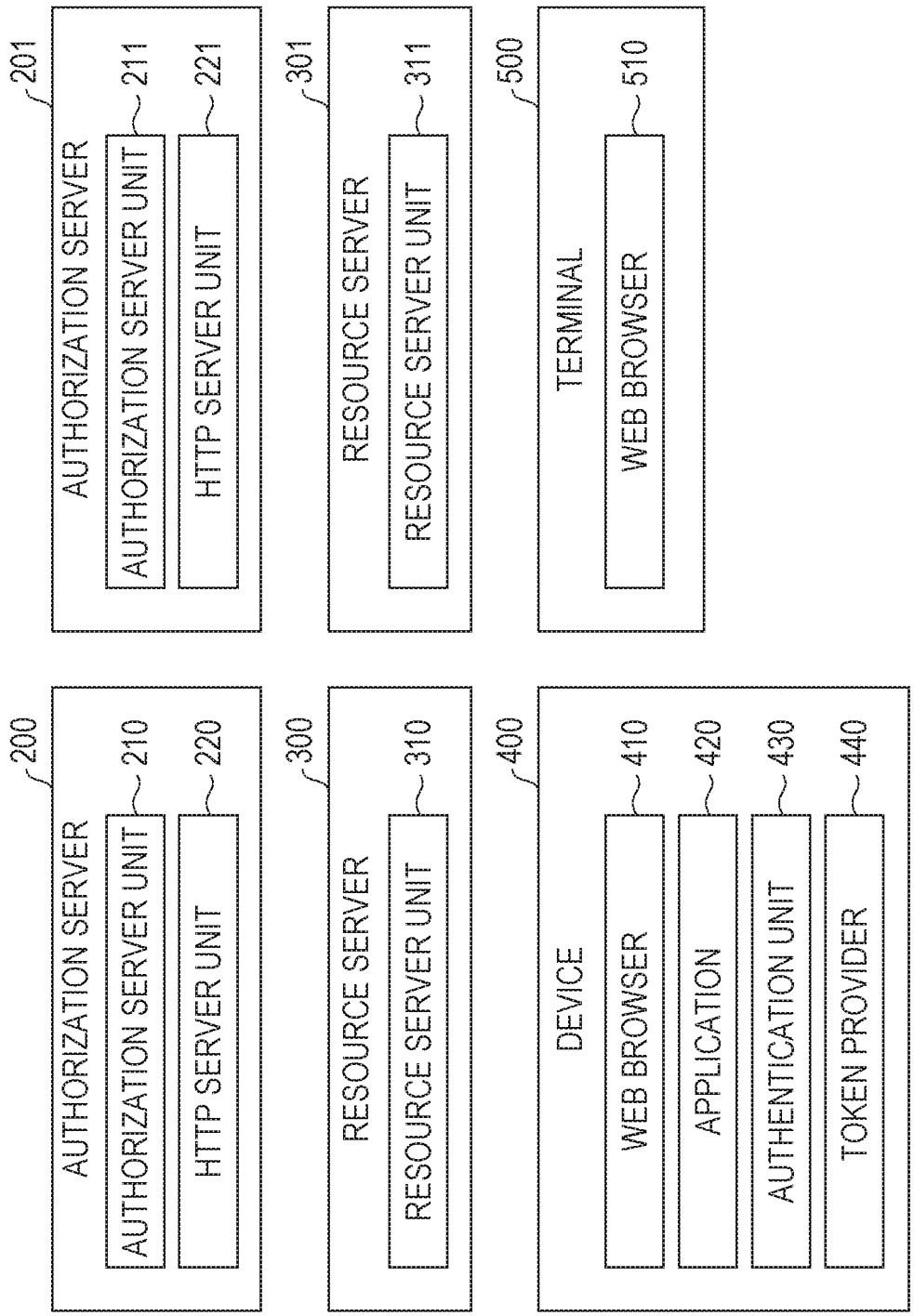
FIG. 3 is a diagram illustrating functions of the devices.

The functions that the authorization servers 200 and 201, resource servers 300 and 301, device 400, and terminal 500 have will be described with reference to FIG. 3 next. Note that the authorization server 201 and authorization server 200, and the resource server 300 and resource server 301, each have the same functions, so the authorization server 200 and resource server 300 will be exemplarily described in the description of FIG. 3.

The authorization server 200 has an authorization server unit 210 and an HTTP server unit 220. The HTTP server unit 220 is connected to the device 400 and terminal 500 via the WAN 100, and has functions of performing HTTP communication with the Web browser 410, Web browser 510, and later-described application 420. The HTTP server unit 220 is also capable of communication by SSL/TLS, and as a certificate store that is omitted from illustration.

The authorization server unit 210 has a function of receiving requests from Web browser 410 and Web browser 510 via the HTTP server unit 220, and responding with results as to the received requests. Specifically, the HTTP server unit 220 receives a user authentication request from the Web browser 410 or 510, generates information related to an authorization token associated with user information of a user regarding which authentication has been successful, and notifies the Web browser 410 or 510 of the authorization token. An authorization token is a token indicating that the user is logged into the authorization server 200, or a token to verify whether the user has been authenticated at the authorization server 200. The authorization server 200 can identify users by using authorization tokens. The authorization server unit 210 can be configured to store a secret key for providing authorization tokens with signature information. In this case, signature information is provided to an authorization token using this secret key, and the authorization token provided with the signature information is issued to the device 400.

The resource server 300 has a resource server unit 310. The resource server unit 310 is a function for making public an API for providing Web services. Note that a configuration may be made where the resource server 300 has an HTTP server unit and carries out external reception and transmission via the HTTP server unit, the same as with the authorization server 200.

The device 400 has the Web browser 410, the application 420, an authentication unit 430, and a token provider 440. The Web browser 410 is a function that is realized by a user agent for using the WWW. The Web browser 410 communicates with the authorization server 200 and token provider 440 through user operations. The Web browser 510 that the terminal 500 has also has the same functions as the Web browser 410. The application 420 obtains an authorization token from the authorization server 200 via the token provider 440. The obtained authorization token is used to use the API that the resource server 300 has made public.

The token provider 440 receives an authorization token request from the application 420, and obtains an authorization token through communication with the authorization server 200. The user performs authorization operations by communicating with the authorization server 200 and token provider 440 using the Web browser 410 or 510.

Note that an authorization token request here is a request that the application 420 transmits to the token provider 440 to obtain an authorization token. On the other hand, a token request is also used to describe a request that the token provider 440 transmits to the authorization server 200 or 201 to obtain an authorization token. It should be noted here that a request to obtain an authorization token is referred to differently depending on who the transmitting party and the receiving party of the request is.

The token provider 440 has a client certificate stipulated by the X.509 standard and the secret key thereof, to prove the token provider 440 itself, as a vendor default credential. The authorization server 200 can authenticate the token provider 440 by the token provider 440 using the client certificate and secret key thereof at the time of establishing communication with the authorization server 200.

The authentication unit 430 is a function for authenticating the user. The user inputs a local user ID and local user password at an input screen that is omitted from illustration, at the device 400. The device 400 that has received the input information performs user authentication processing by matching the information registered in the authentication unit 430 beforehand (local user ID and local user password) with the input information, and generates login context. Note that the form of authentication processing is not restricted to this arrangement, and may be authentication using an integrated circuit (IC) card, or biometric authentication using fingerprints or the like.

The login context is information for identifying the local user at the device 400, and is made up of a local user TD, for example. The login context is generated at the OS (omitted from illustration) at the point that the local user logs into the device 400, and ceases to exist upon logout. A Web page to which the local user, who is logged in, has access rights is made public on the Web browser 410 by the login context being generated by the login operation of the local user. The login context ceases to exist after a logout operation by the local user, whereby security is ensured since the Web page to which the local user has access rights, will not be made public to another user.

This login context is shared among the application 420, authentication unit 430, and token provider 440. Note that an arrangement may be made where the login context not only includes local user information, but region information of the region where the user information associated with the local user information is situated. In this case, when the login context is generated at the device 400, region information is also shared among the application 420, authentication unit 430, and token provider 440. The token provider 440 may identify the authorization endpoint that is the destination to which the authorization code request is transmitted, based on the shared region information and local user information.

Although an arrangement is described in the present embodiment where login processing to the device 400 is performed by the user directly operating the device 400 and logging in, the login may be remotely performed via the Web browser 510 as well. In this case, the authentication unit 430 responds to the Web browser 510 with a login screen that is omitted from illustration. The user is authenticated by inputting the local user ID and local user password at that login screen. In doing so, the login context generated at the authentication unit 430 is shared among application 420, authentication unit 430, and token provider 440.

Figure 4:
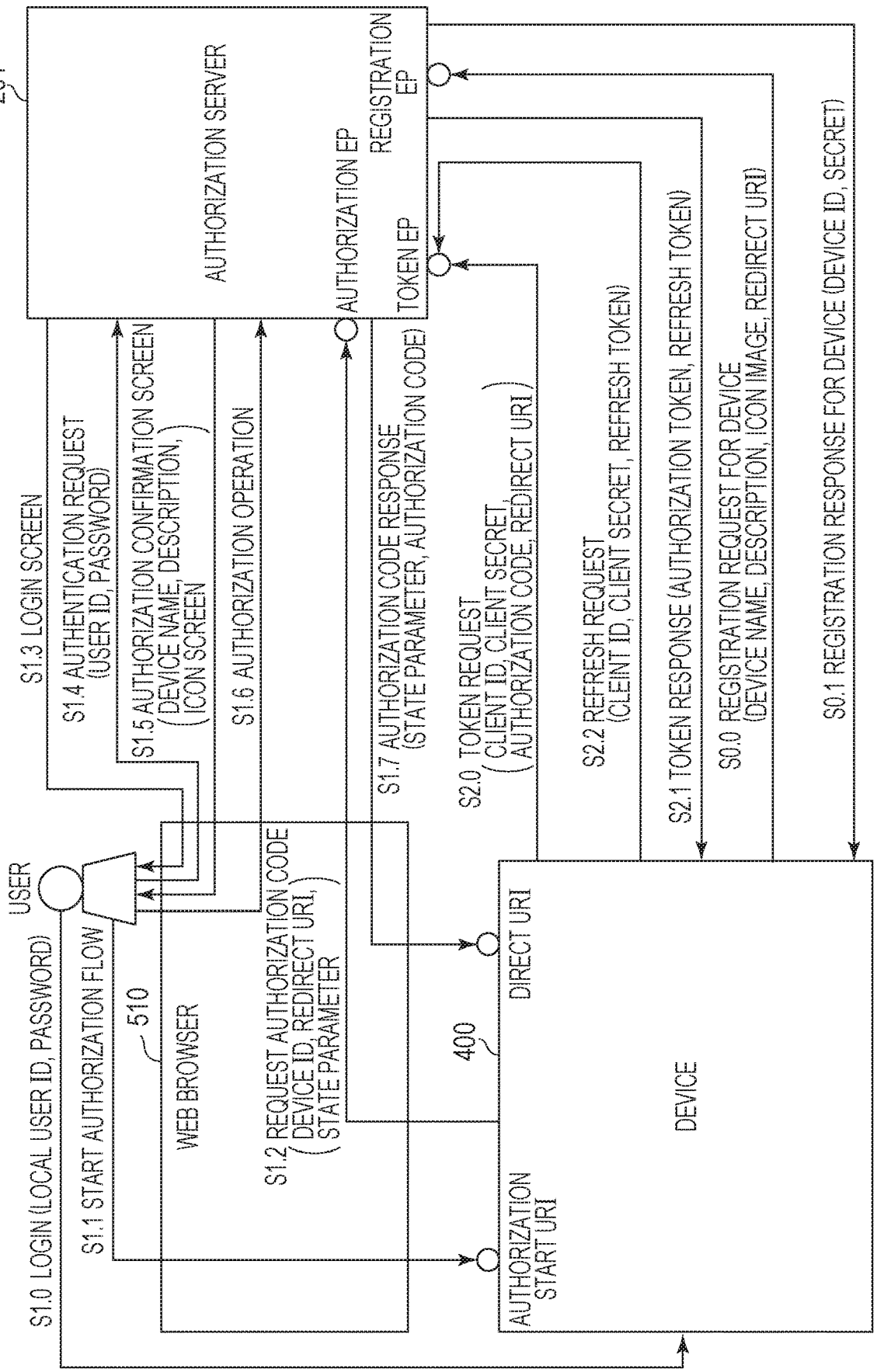
FIG. 4 illustrates a processing flow of Authorization Code Grant in OAuth 2.0.

Next, the OAuth 2.0 processing that the token provider 440 of the device 400 provides will be made using the authorization servers 200 and 201, resource servers 300 and 301, device 400, and Web browser 510, with reference to FIG. 4. Although the authorization server 201 is exemplarily used in FIG. 4 for description, the authorization server 200 can be applied in the same way. Also, an example of OAuth 2.0 being the authentication authorization technology that the token provider 440 provided will be described in the present embodiment, this may be an arrangement other than OAuth 2.0 as long as an authorization token is issued. Note that processing, of which the device 400 is the primary entity in the following description of FIG. 4, is performed by the token provider 440 unless specifically stated otherwise.

As preliminary operations to execute OAuth 2.0, a registration request is made to the authorization server 201, to register the device 400 (S0.0). Specifically, a registration request for the device 400 is transmitted to a registration endpoint (endpoint is abbreviated to "EP" in FIG. 4) of the authorization server 201, and is started when the device 400 is booted or in a case where the device 400 is unregistered at the point of starting the authorization flow in the later-described S1.1. Examples of methods for making a registration request include a method of the device 400 autonomously communicating with the authorization server 201, and a method of the user accessing the authorization server 201 via the Web browser 510 and registering the device 400.

The registration request in S0.0 includes a device name, description, icon image, and a redirect URI that is an indispensable parameter, to be displayed in a later-described authorization confirmation screen. A redirect URI is an address specifying a transmission destination to which the device 400 transmits an authorization code response. The authorization code response will be described later. The authorization server 201 that has received the registration request from the device 400 issues a device ID for identifying the device 400, and a device secret that is secret information for authenticating the device 400, and transmits to the device 400 as a registration response for the device 400 (S0.1). In S0.1, the authorization server 201 stores the device ID and device secret, and the various types of information and the redirect URI received in S0.0, in an associated manner. This so far is the registration flow at the device 400, as preliminary operations for executing OAuth 2.0.

Next, the flow for user authentication at the authorization server 201 will be described with reference to FIG. 4. The user logs into the device 400 (S1.0). The authentication unit 430 of the device 400 generates and stores login context that is information for identifying the user who has logged in. Information identifying the user who has logged in (local user ID, etc.) can be obtained from the generated login context. The OAuth 2.0 authorization flow is started by the user accessing the URI for starting authorization via the Web browser 510 (S1.1). Upon accessing the authorization start URI to start the authorization flow, the device 400 transmits an authorization code request to the authorization endpoint of the authorization server 201 (S1.2). The authorization code request includes device ID, redirect URI, and a state parameter.

The state parameter is information for uniquely associating the authorization code request and authorization code response and is used to prevent cross-site request forgery (CSRF) attacks and token replace (hereinafter "authorization code replace") attacks. Accordingly, the state parameter needs to be a value that cannot be predicted and also is distinct. The state parameter issued by the device 400 is managed by the device 400 in a manner associated with the redirect URI and login context, in order to verify matching of the state parameter that the device 400 receives in the later-described authorization code response with the state parameter transmitted in the authorization code request in S1.2, and further to identify the user executing the authorization code request.

The authorization server 201 that has received the authorization code request in S1.2 responds with a login screen for user authentication on the Web browser 510 in a case where the user has not logged into the authorization server 201 (S1.3). The user inputs the user ID and password via the Web browser 510, and makes an authentication request to the authorization server 201 (S1.4). the authorization server 201 that has received the authentication request verifies whether the association information of user ID and password received in S1.4 matches the association information registered beforehand, and if matching, issues an authentication token. The issued authorization token is attached to an authentication cookie and returned to the Web browser 510.

The authorization server 201 responds to the user with an authorization confirmation screen for acknowledgement of authorization of the device 400 on the Web browser 510 (S1.5). However, in a case where the combination of the device ID and direct URI received in S1.2 does not match the combination of the device ID and redirect URI registered in the authorization server 201 beforehand, the authorization server 201 responds with an error screen to the Web browser 510. Accordingly, redirecting (transferring) to an unauthorized URI can be prevented. In a case where the user logging into the authorization server 201 has already completed authorization operations with the same device ID, S1.5 may be omitted.

After authorization operations by the user (S1.6), the authorization server 201 issues an authorization code, and transmits the authorization code and state parameter to the device 400 as an authorization code response (S1.7). Specifically, the authorization code and state parameter are attached to the redirect URI as query parameters, and transmitted to the Web browser 510 so that the authorization code and state parameter will be redirected to the destination specified by the redirect URI. The authorization code issued in S1.7 is saved in the authorization server 201 in a manner associated with the device ID, user ID, and redirect URL.

The device 400 that has received the authorization code response as to the redirect URI verifies whether the state parameter included in the authorization code response matches the state parameter that the device 400 manages. In a case where the state parameters match as a result of verification, the device 400 transmits a token request to the token endpoint of the authorization server 201, to obtain an authorization token (S2.0). The token request includes the device ID, secret, authorization code obtained in S1.7, and redirect URI obtained in S1.2.

The authorization server 201 that has received the token request in S2.0 verifies whether the combination of device ID and secret matches the combination registered beforehand. In a case of matching being configured as a result of the verification, the device 400 is authenticated. Further, the authorization server 201 verifies whether the authorization code received in S2.0 is stored at the authorization server 201, whether the authorization code has not expired if stored, and whether the device ID and redirect URI associated with the authorization token match that received in the token request in S2.0. Thus, the authorization server 201 can verify whether the device 400 that has transmitted the authorization code request in S1.2 and the device 400 that has transmitted the token request in S2.0 match, by this verification.

In a case where verification is successful, the authorization server 201 issues an authorization token to the device 400, and responds to the device 400 with a token response (S2.1). At this time, an arrangement may be made where a refresh token is also issued to the device 400 to renew an authorization token, and respond with a token response. The device 400 is able to access the API that the resource server 301 has made public by using the authorization token received in S2.1. Discarding the authorization code managed at the authorization server 201 after having issued the authorization token enables replay attacks to be prevented.

In a case where the token response of S2.1 includes a refresh token, the login context and refresh token are managed in the device 400 in an associated manner. Accordingly, an authorization token can be obtained again without executing the authorization processing (S1.2 through S1.7) the next time and subsequent times accessing the API. Specifically, when accepting the start of authorization in S1.1, confirmation is made regarding whether the login context of the user and the refresh token are associated at the device 400. If not associated, the above-described OAuth 2.0 flow (processing of S1.2 and thereafter) is performed. If associated, a refresh request is performed as to the token endpoint of the authorization server 201 (S2.2).

A refresh request includes device ID, secret, and the refresh token. The authorization server 201 that has received a refresh request verifies whether the combination of device ID and secret matches that registered beforehand in S0.1. Once matching is confirmed and the device 400 is authenticated, the authorization server 201 verifies whether the received refresh token is stored at the authorization server 201, whether the refresh token has not expired if stored, and whether the device ID associated with the refresh token match that in the refresh request. In a case where all of these verifications succeed, the authorization server 201 issues an authorization token, and transmits the authorization token to the device 400 as a token response. At this time, an arrangement may be made where a refresh token is reissued to renew an authorization token, and transmitted to the device 400 at the same time as the token response. Discarding the refresh token managed at the authorization server 201 so far after having issued the new refresh token enables replay attacks to be prevented.

This so far has been a processing flow of Authorization Code Grant in OAuth 2.0. The processing flow according to OAuth 2.0 enables the authorization server 201 to issue an authorization token, and the device 400 to access an API that the resource server 301 has made public using the issued authorization token, rather than the authorization server 201 transmitting user information that it manages to the device 400.

First Embodiment

It is not always the case that user information is registered in an authorization server in a certain particular region, and that multiple sets of user information are managed in authorization servers in the same region. There also are cases where restrictions are placed on transfer and sharing of user information among different regions, from the perspectives of protection of personal information, national security, and so forth. In such a case, the token provider 440 needs to select an authorization server corresponding to a region specified by the application 420 out of multiple authorization servers, and to transmit an authorization code request to that authorization server. An arrangement where the token provider 440 identifies and selects the authorization server managing the user information will be described in a first embodiment.

Figure 5:
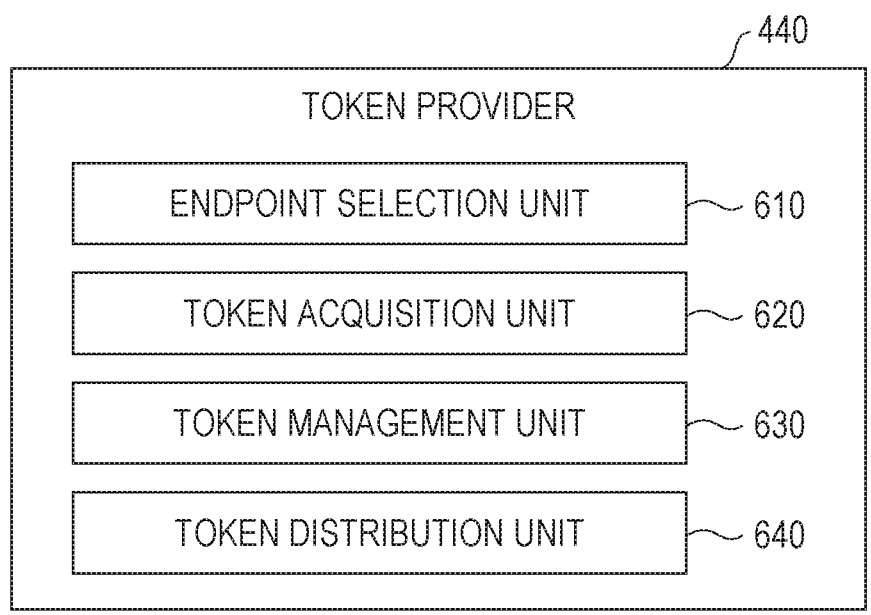
FIG. 5 illustrates functions of a token provider.

First, the functions that the token provider 440 has will be described with reference to FIG. 5. The token provider 440 includes an endpoint selection unit 610, a token acquisition unit 620, a token management unit 630, and a token distribution unit 640.

The endpoint selection unit 610 is a function that transmits an authorization code request (S1.2 in FIG. 4) to the authorization endpoint of the authorization server 200 or 201 in the authorization flow according to OAuth 2.0. At this time, the endpoint selection unit 610 selects an authorization endpoint URL corresponding to the region specified by the application 420, using a correlation table between region information and authorization endpoint URLs that the endpoint selection unit 610 has. Table 1 illustrates an example of the correlation table that the endpoint selection unit 610 has. A case will be assumed in the present embodiment where the authorization server 200 is located in region "JP", and the authorization server 201 is located in region "EU". The authorization server of the region "GB" including the authorization endpoint in Table 1 is omitted from illustration in FIG. 1.

TABLE 1

Endpoint URL Database

| No. | Region | Authorization Endpoint URL | Token Endpoint URL |
| --- | --- | --- | --- |
| 1 | JP | https://jp.example.com/oauth2/authorize | https://jp.example.com/oauth2/token |
| 2 | EU | https://eu.example.com/oauth2/authorize | https://eu.example.com/oauth2/token |
| 3 | GB | https://gb.example.com/oauth2/authorize | https://gb.example.com/oauth2/token |

Table 1 has columns of "No." (item number), "region", "authorization endpoint URL", and "token endpoint URL", with the region being the main key. "JP" and "EU" are registered to "region" in the present embodiment, and the authorization endpoint URL, and token endpoint URL are registered for each region in a correlated manner. Registration of data to Table 1 may be executed from an external application or the like, and any form of registration may be used.

The token acquisition unit 620 is a function of transmitting a token request to the token endpoint (S2.0). The token acquisition unit 620 references Table 1 and transmits a token request to the token endpoint corresponding to the region specified by the application 420.

The token management unit 630 is a function of managing the authorization tokens obtained by the token acquisition unit 620 for each local user ID. Table 2 is an example of a token database that the token management unit 630 manages.

TABLE 2

Token Database

| No. | Local User ID | Region | Authorization Token | Refresh Token |
| --- | --- | --- | --- | --- |
| 1 | Local_user1 | JP | utbhtpbtrmjuevnryy0enlqe9vairx | o23Tx1T1dLRiimDq6CDDs |
| 2 | Local_user1 | EU | t3geevy18czkcb9lujmtgchmuyivzg | ZTTcC8dNzTiF9FF84wF8wy |
| 3 | Local_user2 | GB | t3geevy18czkcb9lujmtgchmuyivzg | ZTTcC8dNzTiF9FF84wF8wy |

Table 2 has columns of "No.", "local user ID", "region", "authorization token", and "refresh token", with the local user ID and region being the main keys. The refresh token is a new access token for using the same authorization flow again, as in "6. Refreshing an Access Token" in OAuth 2.0 RFC6749, which has been described above. Table 2 is generated by the authorization flow illustrated in FIG. 4 (S1.0 through S2.2) having been executed, and is managed by the token management unit 630.

Further, multiple regions "JP" and "EU" are associated with one local user ID "Local_user1" in Table 2. That is to say, multiple sets of user information associated with one local user ID will be stored in the authorization server 200 of region "JP" and the authorization server 201 of region "EU". In this case, the authorization server to which an authorization token is requested is switched by the user switching the region to "JP" or "EU" at the application 420, and any arrangement may be used for the application 420.

The token distribution unit 640 is a function that transmits an authorization token to the application 420 based on the local user ID and region information. Specifically, region information and the local user ID are received from the application 420. The token distribution unit 640 transmits an authorization token associated with the received local user ID and region information to the application 420 based on Table 2.

In a case where there is no combination of the received local user ID and the region information specified by the application 420 in Table 2, the authorization flow (FIG. 4) is deemed not to have been executed yet. The endpoint selection unit 610 then identifies the authorization endpoint URL of the region using the specified region information and Table 1, obtains the authorization token and refresh token from the authorization server 200 identified by this authorization endpoint URL, and stores in the token management unit 630 (Table 2) along with the local user ID and region information. This so far has been the functions of the token provider 440.

Figure 6:
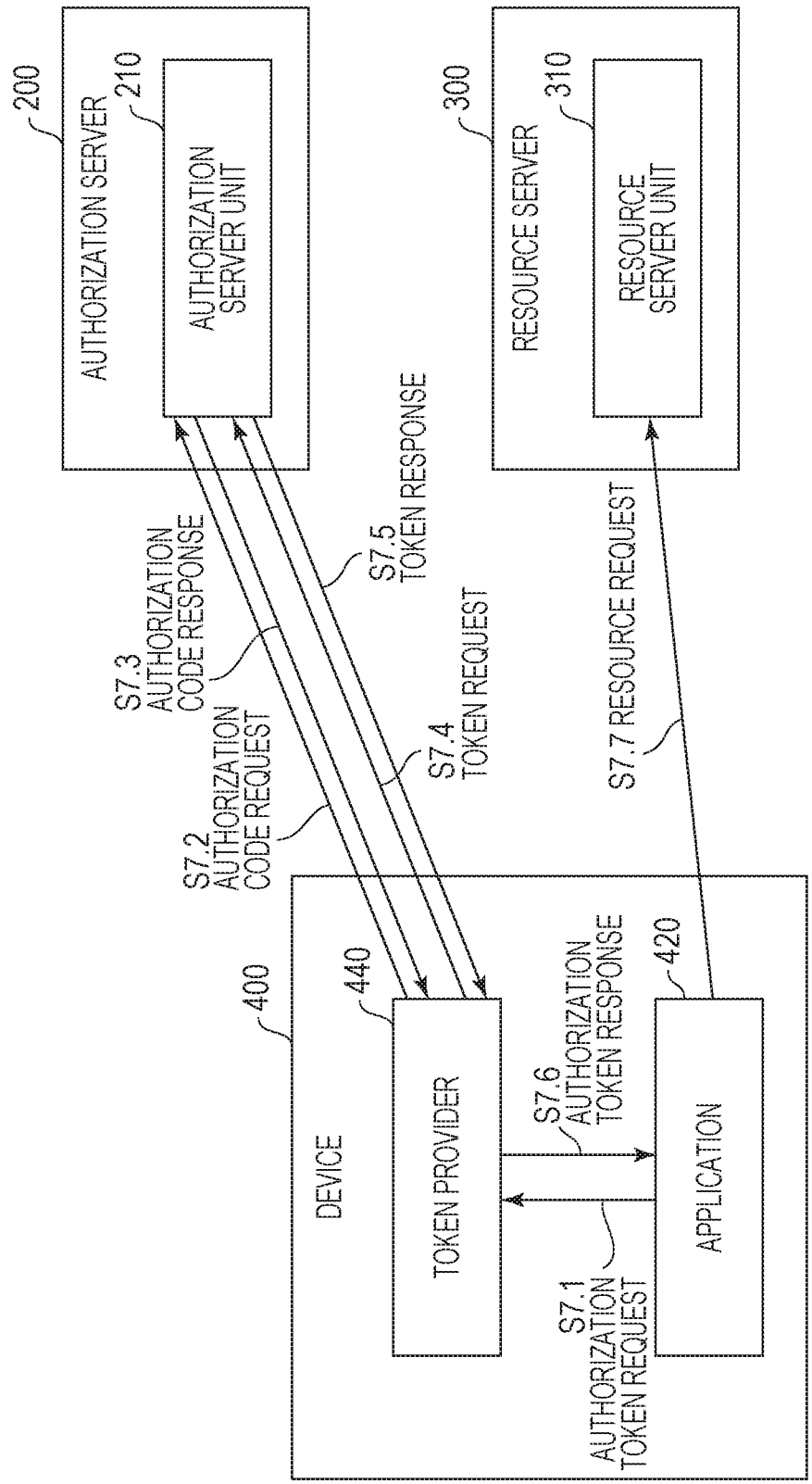
FIG. 6 is a sequence diagram of operations of the token provider.

Next, the processing from the application 420 obtaining an authorization token from the authorization server 200 via the token provider 440 up to executing an API that the resource server 300 or 301 has made public using the obtained authorization token will be described with reference to FIG. 6. Note that while description will be made in FIG. 6 using the authorization server 200 and resource server 300, the same processing is executed by the authorization server 201 and resource server 301 as well. Detailed description of processing already described above will be omitted.

First, the application 420 transmits an authorization token request to the token provider 440 (S7.1). Specifically, the application 420 transmits the local user ID and region information as an authorization token request. Several arrangements are conceivable by which the application 420 obtains region information. For example, an arrangement is conceivable where the user inputs or selects region information at the time of the user inputting the local user ID and password using the Web browser 410 of the device 400. FIG. 9 illustrates an example of a screen for selecting the region. In FIG. 9, "User ID" is provided as an input space of the local user ID, "Password" as an input space for the password, and "Region" as a space where a region can be selected from a pulldown menu.

An arrangement can also be conceived where the application 420 determines whether region information is included in the login context generated at the time of the user logging into the device 400. In a case of determining that region information is included, the authorization endpoint is identified based on the region information included in the login context, as described above. In a case of determining that region information is not included, a screen is provided through the Web browser 410 or 510 for the user to input or select the region. Another conceivable arrangement is for the application 420 to transmit identified region information to the token provider 440, based on information of the language that the user uses, set in the application 420 or Web browser 410 or the like beforehand, and so forth.

The token provider 440 searches for a record matching the association information of the received local user ID and region information, from the local user ID and region information received in S7.1, using the token database (Table 2) that the token management unit 630 of the token provider 440 has. In a case where a record is found matching the association information of the local user ID and region information, an authorization token associated with the local user ID and region information is transmitted to the application 420 (S7.6).

In a case where no matching record is found, the token provider 440 identifies the authorization endpoint URL from the region information received in the authorization token request, and Table 1. The processing illustrated in S1.3 through S2.1 in FIG. 4 is executed using the identified authorization endpoint URL, to obtain an authorization token from the authorization server 200.

The token provider 440 that has received the authorization token request in S7.1 transmits an authorization code request to the authorization server unit 210 (S7.2). S7.2 is the same processing as S1.2 in FIG. 4, so detailed description will be omitted. The authorization server unit 210 that has received the authorization code request executes the processing of S1.3 through S1.6 in FIG. 4, and thereafter transmits an authorization code response to the token provider 440 (S7.3). S7.3 is the same processing as S1.7 in FIG. 4, so detailed description will be omitted.

The token provider 440 that has received the authorization code response in S7.3 transmits a token request to the token endpoint of the authorization server 200 (S7.4). The processing of S7.4 is equivalent to the processing of S2.0 in FIG. 4, so detailed description will be omitted. The authorization server unit 210 that has received the token request transmits an authorization token and refresh token to the token provider 440 as a token response (S7.5). The processing of S7.5 is equivalent to the processing of S2.1 in FIG. 4, so detailed description will be omitted.

After executing S7.5, the token provider 440 registers the authorization token and refresh token obtained in S7.5, and the local user ID and region information obtained from the application 420 in S7.1, in the token database (Table 2).

After receiving the token response in S7.5, the token distribution unit 640 transmits the authorization token obtained in S7.5 to the application 420 (S7.6). The application 420 that has obtained the authorization token transmits a resource request to the resource server unit 310 using the authorization token (S7.7). This so far is the processing from the application 420 obtaining an authorization token from the authorization server 200 using the token provider 440, up to executing the API that the resource server 300 or 301 has made public using the obtained authorization token.

Figure 7:
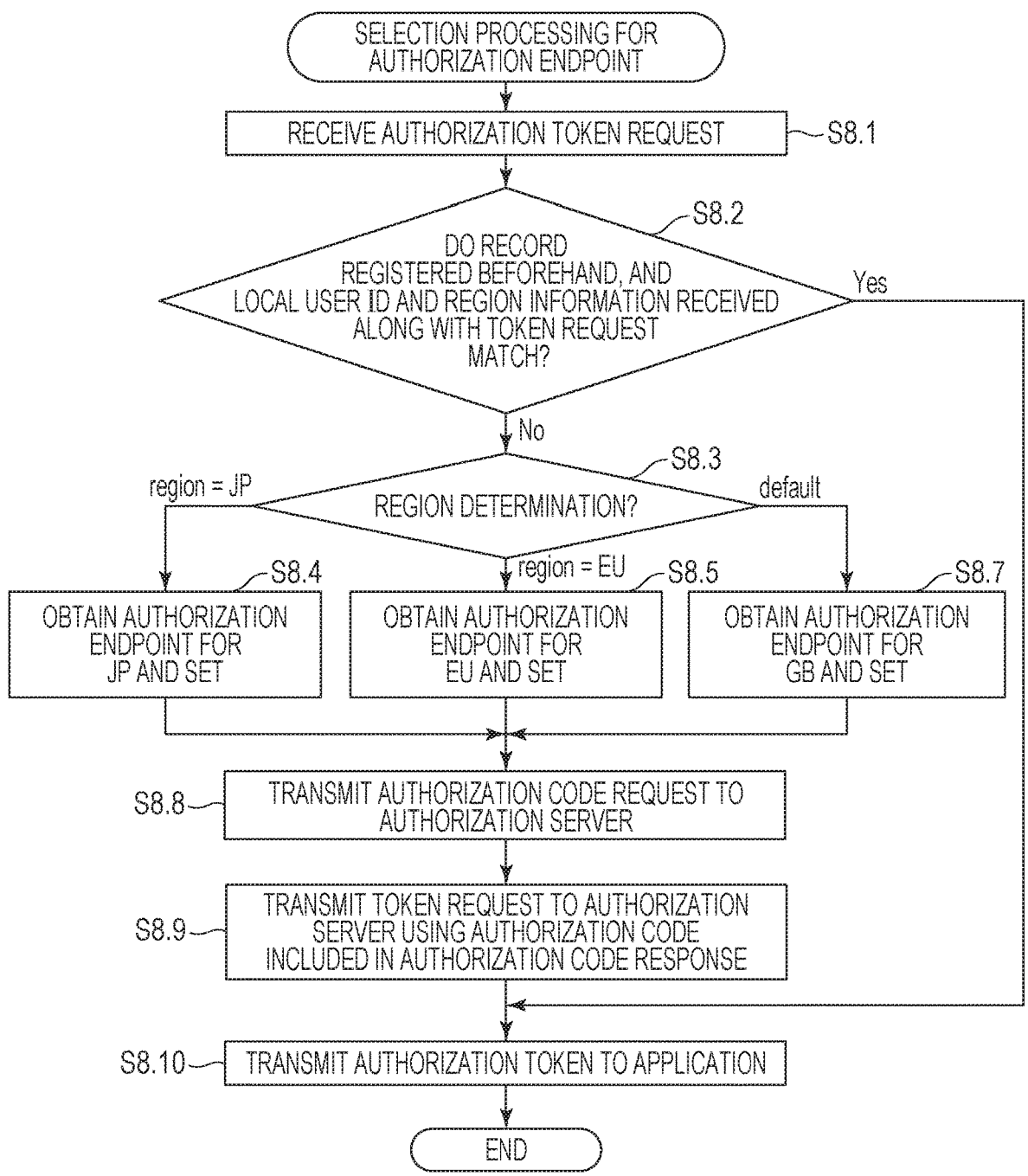
FIG. 7 is a flowchart illustrating selection of an authorization endpoint in a first embodiment.

Next, selection processing of an authorization endpoint at the time of the token provider 440 obtaining an authorization token will be described with reference to FIG. 7.

First, the token distribution unit 640 receives the local user ID and region information as an authorization token request from the application 420 (S8.1). Description will be made this time assuming that the token distribution unit 640 has received a local user ID "Local_user2" and region information "JP" as an authorization token request.

The token management unit 630 uses the token database (Table 2) to confirm whether there is a record matching the received local user ID (S8.2). It can be seen from Table 2 that association information of the local user ID and region information do not match the record stored beforehand. If a matching record is confirmed, the authorization token included in that record is transmitted to the application 420 (S8.10).

If confirmation is made that there is no record, the endpoint selection unit 610 performs determination to identify an authorization endpoint URL, based on the region specified in S8.1 (S8.3). Specifically, the endpoint selection unit 610 obtains and sets an authorization endpoint matching the region "JP" that has been specified, based on the endpoint URI, database (Table 1) (S8.4). The URI, obtained as an authorization endpoint URL this time is "https://jp.example.com/oauth2/authorize" from Table 1. The processing of one of S8.4 through S8.7 is executed, in accordance with the region information received in the authorization token request in S8.1. In a case where there is no region specification by the application 420, or the region that has been specified is not included in Table 1, the processing of S8.7 is executed with the default region "GB". Note however, that the authorization server located in region "GB" is ab authorization server other than the authorization servers 200 and 201 (omitted from illustration in FIG. 1).

The token acquisition unit 620 transmits an authorization code request to the authorization endpoint URL identified in S8.4 through S8.7 (S8.8). S8.8 is equivalent to S1.2 in FIG. 4 (or S7.2 in FIG. 6). The authorization code obtained as a result of the processing in S8.8 is used to transmit a token request to the authorization server 200 (S8.9). S8.9 is equivalent to S2.0 in FIG. 4 (or S7.4 in FIG. 6). The authorization token obtained as a result of the processing of S8.9 is transmitted to the application 420 (S8.10). This so far is the processing of authorization endpoint selection at the time of the token provider 440 obtaining an authorization token.

According to the present embodiment, when a region is specified from the application 420, the token provider 440 can select an appropriate authorization endpoint, and an authorization code request can be transmitted to an authorization server according to the specified region information.

Although description has been made in the present embodiment regarding an arrangement where the local user ID is obtained from the application 420, an arrangement may be made where the local user ID is identified from the login context generated at the authentication unit 430 when the user logs into the device 400 in S1.0 (FIG. 4).

Second Embodiment

An arrangement has been described in the first embodiment where the application 420 specifies a region to the token provider 440, taking into consideration cases where restrictions are placed on transfer and sharing of user information among different regions, from the perspectives of protection of personal information, national security, and so forth. However, there is also an arrangement where a fixed region is set in the token provider 440 beforehand, besides the arrangement where the application 420 specifies the region.

An arrangement will be described in a second embodiment where, whether to transmit an authorization code request to an authorization server identified by fixed region information, or whether or execute the first embodiment, is switched in accordance with determination results regarding whether or not a region that is the obtaining destination of the authorization code is set fixed. Note that portions of which description is omitted in the second embodiment are the same as the first embodiment.

Figure 8:
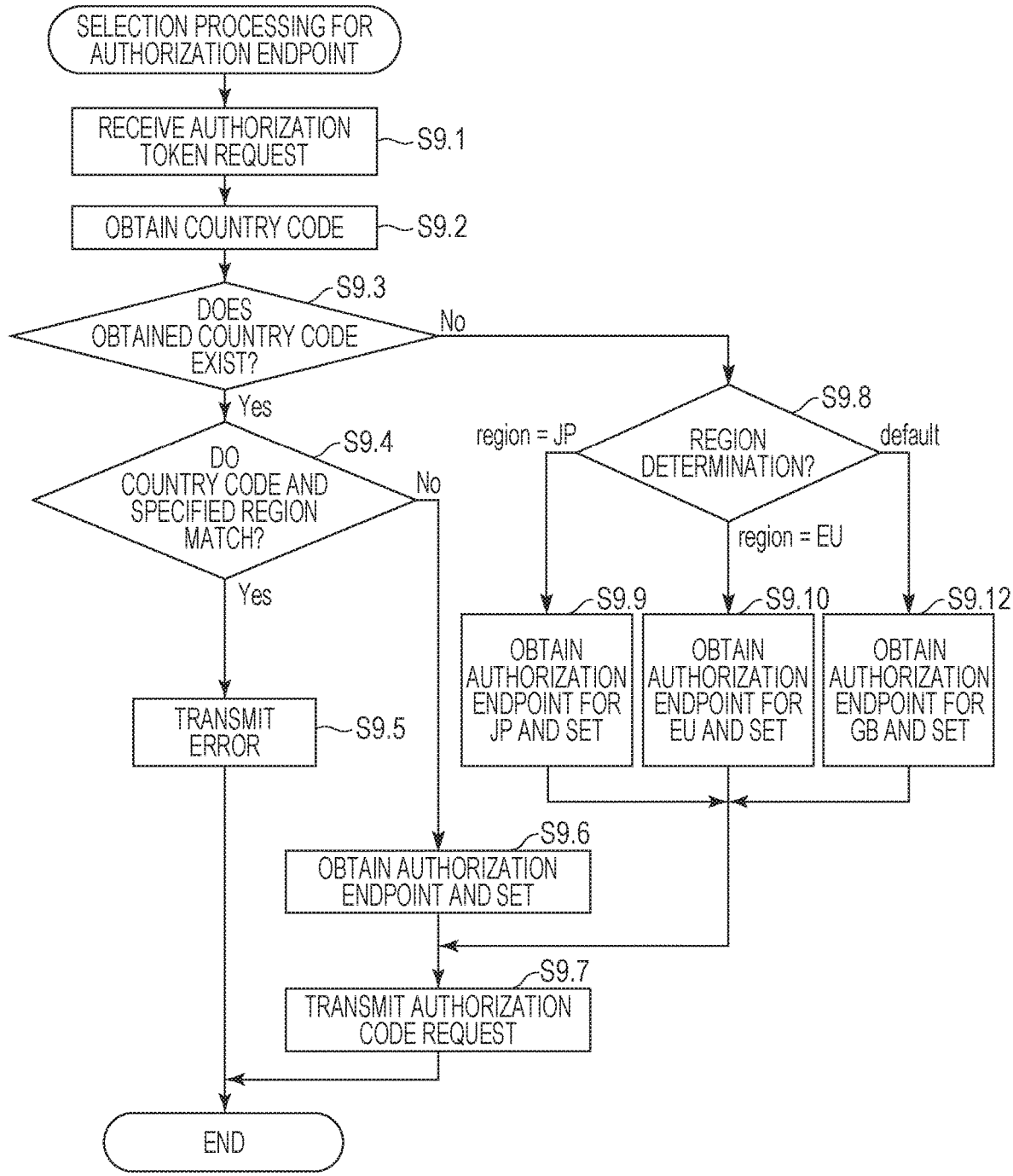
FIG. 8 is a flowchart illustrating selection of an authorization endpoint in a second embodiment.

First, processing of the token provider 440 transmitting an authorization code request to the authorization server will be described with reference to FIG. 8. The token distribution unit 640 requests region information as an authorization token request from the application 420 (S9.1).

The endpoint selection unit 610 does not use the region information received in S9.1, and identifies an authorization endpoint URL based on the setup location of the device 400. Specifically, the token provider 440 obtains a country code (country code in ccTLD used by ICANN and so forth) from the IP address set in the NC 2008 of the device 400 (S9.2). Obtaining of a country code is executed by the endpoint selection unit 610 searching the GeoIP database provided by MaxMind, Inc., whereby country codes can be identified from IP addresses. Other arrangements besides searching the GeoIP database may be used for obtaining country information set in locale information of the device 400 as a country code. In this case, assumption will be made that the country code is "FR", from the setup location of the device 400.

The endpoint selection unit 610 determines whether the country code obtained in S9.2 matches the region information set to the token provider 440 (S9.3). This is executed based on a fixed region determination table that the endpoint selection unit 610 has. An example of a fixed region determination table is shown in Table 3.

TABLE 3

Fixed Region Determination Table

| No. | Fixed Region | Country Code |
|-----|--------------|--------------|
| 1   | JP           | JP           |
| 2   | EU           | FR, IE, DE, ES |

Table 3 has columns of "No." (item number), "fixed region", and "country code (country code in ccTLD used by ICANN and so forth)". The "fixed region" is a region which the token provider 440 should set with regard to "country code". The endpoint selection unit 610 determines from the fixed region determination table (Table 3) whether or not a fixed region exists with regard to the country code obtained in S9.2. If a fixed region does not exist, the flow advances to S9.8, and an authorization endpoint URL is obtained from the region specified by the application 420 and set (S9.9 through S9.12). S9.8 and subsequent processing (S9.9 through S9.12) is the same as the content of processing in the first embodiment (S8.3 through S8.7) in FIG. 7, so detailed description will be omitted.

Although description has been made in the present embodiment regarding determining whether or not to switch to the processing of the first embodiment depending on whether or not fixed region information is present in the fixed region determination table in Table 3, with regard to the country code obtained in S9.2, this determination method is not restrictive. For example, an arrangement may be conceived where determination is made regarding whether the endpoint selection unit 610 has the fixed region determination table after the token distribution unit 640 has received an authorization token request from the application 420 (S10.1 in FIG. 10). This determination may be executed before the processing of S8.1 (or S9.1). In a case of determination being made in S10.1 that the Table 3 exists, the flow advances to S9.2 and thereafter in the second embodiment (FIG. 8). In a case of determination being made in S10.1 that the Table 3 does not exist, the flow advances to S8.2 and thereafter in the first embodiment (FIG. 7).

In a case where configuration has been made from Table 3 that a fixed region exists with regard to the country code obtained in S9.3, the fixed region information and the region information received from the application 420 are compared (S9.4). If a match is confirmed from the comparison the flow advances to S9.6, and if a match is not confirmed, advances to S9.5. The country code obtained in S9.2 this time is "FR", so it can be seen from Table 3 that the fixed region "EU" exists. If the region information obtained in S9.1 is "FR", the flow advances to S9.6.

On the other hand, in a case where the region information obtained in S9.1 is "CN", this does not match the fixed region "EU" of the token provider 440 so the flow advances to S9.5. Specifically, the token provider 440 transmits error information to the application 420 (S9.5). The error information may include a message to the effect that the fixed region information set fixed with regard to the token provider 440 and the region information identified based on the obtained country code do not match, but any arrangement will suffice for the error information.

In a case where determination is made in S9.4 that there is a match, the endpoint selection unit 610 identifies an authorization endpoint using the obtained country code or fixed region information, and the endpoint URL database (Table 1) (S9.6).

After the authorization endpoint URL has been identified in S9.6 or S9.9 through S9.12, the token acquisition unit 620 transmits an authorization code request to the identified authorization endpoint URL (S9.7).

This so far has been processing to fix an authorization endpoint at the time of the token provider 440 obtaining an authorization token.

Other Embodiments

Although region information has been described as being "JP" and "EU" (with default region information "GB"), the types and numbers of region information are not restricted to the above examples.

Although description has been made above that processing is to advance using region information set as a default in the above flow in a case where no region is specified by the application 420, or in a case where the specified region is not included in Table 1, an arrangement may be made where error information is transmitted and processing is ended in such cases.

Embodiment(s) of the present disclosure can also be realized by a computer of a system or apparatus that reads out and executes computer executable instructions, one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-187132 filed Sep. 27, 2017, which is hereby incorporated by reference herein in its entirety.

What is claimed is:

1. A device comprising:
a transmission unit configured to transmit, to an authorization server, an authorization code request for the authorization server to issue an authorization code, wherein the authorization code is a token to acquire an authorization token indicating that a user has permitted the device to access a resource server;
a reception unit configured to receive an authorization code response from the authorization server corresponding to the authorization code request; and
a token provider which obtains region information, identifying a region where the authorization server is located, from an application on the device, and identifies, based on the obtained region information, an authorization endpoint, to which to transmit the authorization code request,
wherein the transmission unit transmits the authorization code request to the identified authorization endpoint,
and wherein the reception unit receives the authorization code response corresponding to the authorization code request transmitted by the transmission unit.

2. The device according to claim 1,
wherein the token provider has association information of association between the region information and the authorization endpoint,
and wherein the authorization endpoint to which the authorization code request is to be transmitted is identified based on the association information.

3. The device according to claim 2,
wherein the device transmits a token request, for issuing of the authorization token for the device to access the resource server, to the authorization server along with the authorization code that has been received in the authorization code response,
and wherein the authorization token is obtained from the authorization server in response to the transmitted token request.

4. The device according to claim 3,
wherein the association information of the region information and the authorization endpoint, includes a token endpoint that is the transmission destination to transmit the token request to,
and wherein the token request is transmitted to the token endpoint along with the authorization code.

5. The device according to claim 3, further comprising a determining unit,
wherein the token provider manages a local user ID that is information for identifying a local user logged into the application, the authorization token obtained by the token request, and region information identifying the region where the authorization server that has issued the authorization token is located, in an associated manner, due to an authorization process having been executed such that the device can access the resource server by the user having given permission, wherein the determining unit determines whether the region information received from the application and the local ID match the region information and local ID in the association information, wherein, in a case where the determining unit determines that there is a match, a resource request for the device to use a service that the resource server has made public is transmitted to the resource server, using an authorization token identified by the association information, and wherein, in a case where the determining unit determines that there is no match, the authorization code request is transmitted to the authorization server using association information regarding the region information and the authorization endpoint, and an authorization endpoint identified by region information received from the application.

6. The device according to claim 5, wherein, in a case where region information received from the application is not included in the association information, or region information cannot be obtained from the application, the authorization code request is transmitted to the authorization server using an authorization endpoint identified by region information set as a default and the association information.

7. The device according to claim 1, wherein, in a case of having fixed region information that is region information set beforehand independent from region information received from the application, the token provider determines whether or not region information received from the application and the fixed region information match, wherein, in a case of determining that these match, the authorization endpoint is obtained based on the fixed region information and the association information of the region information and the authorization endpoint, and the authorization code request is transmitted to the obtained authorization endpoint, and wherein, in a case of determining that these do not match, error information is transmitted to the application.

8. The device according to claim 7, wherein the fixed region information is associated with a country code identifying the region where the device is located, the country code having been obtained from an IP address of the device.

9. The device according to claim 7, wherein the token provider includes a second determining unit configured to determine whether or not the token provider has a fixed region determination table that is a table storing fixed region information, wherein, in a case where the second determining unit determines that the token provider has the fixed region determination table, the authorization endpoint is identified based on fixed region information stored in the fixed region determination table, and the authorization code request is transmitted to the identified authorization endpoint, and wherein, in a case where the second determining unit determines that the token provider does not have a fixed region determination table, the authorization endpoint is identified based on region information received from the application, and the authorization code request is transmitted to the identified authorization endpoint.

10. The device according to claim 1, wherein the region information is one of region information that the user has specified when logging into the device, and region information identified based on a language that the user uses on the device.

11. The device according to claim 1, wherein the device generates login context when a local user logs into the device, determines whether the region information is included in the login context, identifies, in a case where determination is made that region information is included in the login context, an authorization endpoint that is a transmission destination to which the authorization code request is transmitted, based on the region information included in the login context, and provides an input screen to request the local user for the region information in a case where determination is made that region information is not included in the login context.

12. A control method, to control a computer, including a transmission unit and a reception unit, the method comprising:

transmitting, to an authorization server, an authorization code request for the authorization server to issue an authorization code, wherein the authorization code is a token to acquire an authorization token indicating that a user has permitted the device to access a resource server;

receiving an authorization code response from the authorization server corresponding to the authorization code request;

obtaining region information identifying a region where the authorization server is located, from an application on the device;

identifying an authorization endpoint, based on the obtained region information;

transmitting the authorization code request to the identified authorization endpoint, using the transmission unit; and receiving the authorization code response corresponding to the authorization code request transmitted by the transmission unit, using the reception unit.

13. A non-transitory storage medium storing instructions that when executed by a device including one or more processors controls a transmission unit configured to transmit, to an authorization server, an authorization code request for the authorization server to issue an authorization code, wherein the authorization code is a token to acquire an authorization code token indicating that a user has permitted the device to access a resource server, and a reception unit configured to receive an authorization code response from the authorization server corresponding to the authorization code request, wherein a token provider, that the device includes, obtains region information, which is information identifying a region where the authorization server is located, from an application on the device, wherein an authorization endpoint, which is a transmission destination to transmit the authorization code request to, is identified based on the obtained region information, wherein the transmission unit transmits the authorization code request to the identified authorization endpoint, and wherein the reception unit receives the authorization code response corresponding to the authorization code request transmitted by the transmission unit.

* * * * *